United States Patent
Yamaura

(10) Patent No.: US 9,373,857 B2
(45) Date of Patent: Jun. 21, 2016

(54) FUEL CELL APPARATUS

(75) Inventor: Kunihiro Yamaura, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 468 days.

(21) Appl. No.: 13/197,865

(22) Filed: Aug. 4, 2011

(65) Prior Publication Data

US 2012/0034545 A1 Feb. 9, 2012

(30) Foreign Application Priority Data

Aug. 5, 2010 (JP) ................................. 2010-175892

(51) Int. Cl.
| | | |
|---|---|---|
| *H01M 8/2465* | (2016.01) | |
| *H01M 8/04* | (2016.01) | |
| *H01M 8/24* | (2016.01) | |

(52) U.S. Cl.
CPC ........ *H01M 8/04201* (2013.01); *H01M 8/2465* (2013.01); *Y02E 60/50* (2013.01)

(58) Field of Classification Search
CPC . H01M 8/2465; H01M 8/04201; H01M 8/04; H01M 8/24
See application file for complete search history.

(56) References Cited

U.S. PATENT DOCUMENTS

| | | | | |
|---|---|---|---|---|
| 6,372,372 | B1 * | 4/2002 | D'Aleo | H01M 8/247 |
| | | | | 429/434 |
| 6,653,008 | B1 * | 11/2003 | Hirakata et al. | 429/434 |
| 7,732,082 | B2 * | 6/2010 | Hayashi et al. | 429/460 |
| 2004/0131917 | A1 * | 7/2004 | Mazza | H01M 8/0206 |
| | | | | 428/304.4 |
| 2010/0291458 | A1 * | 11/2010 | Takeyama | 429/458 |

FOREIGN PATENT DOCUMENTS

| | | | | |
|---|---|---|---|---|
| JP | 2002-343406 | * | 11/2002 | H01M 8/24 |
| JP | 2002-343410 | * | 11/2002 | H01M 8/24 |
| JP | 2009-158338 | * | 7/2009 | H01M 8/06 |
| WO | WO 2009/075178 | * | 6/2009 | H01M 8/10 |

* cited by examiner

*Primary Examiner* — Barbara Gilliam
*Assistant Examiner* — Angela Martin
(74) *Attorney, Agent, or Firm* — Finnegan, Henderson, Farabow, Garrett & Dunner, LLP

(57) ABSTRACT

A fuel cell apparatus includes a fuel cell stack in which an end plate is arranged at both ends of a cell stacked body, and a conduit that is bolted to the fuel cell stack and that supplies and discharges fluid to and from the fuel cell stack. An end plate internal manifold that extends at an angle inclined with respect to a direction in which a stacked body internal manifold extends is formed inside the end plate. A conduit internal flow path is formed inside the conduit. A direction in which a portion that includes an end plate-connecting portion of the conduit internal flow path extends is inclined in the same direction as the direction in which the end plate internal manifold is inclined, with respect to a direction perpendicular to a surface of the end plate.

6 Claims, 7 Drawing Sheets

F I G . 1
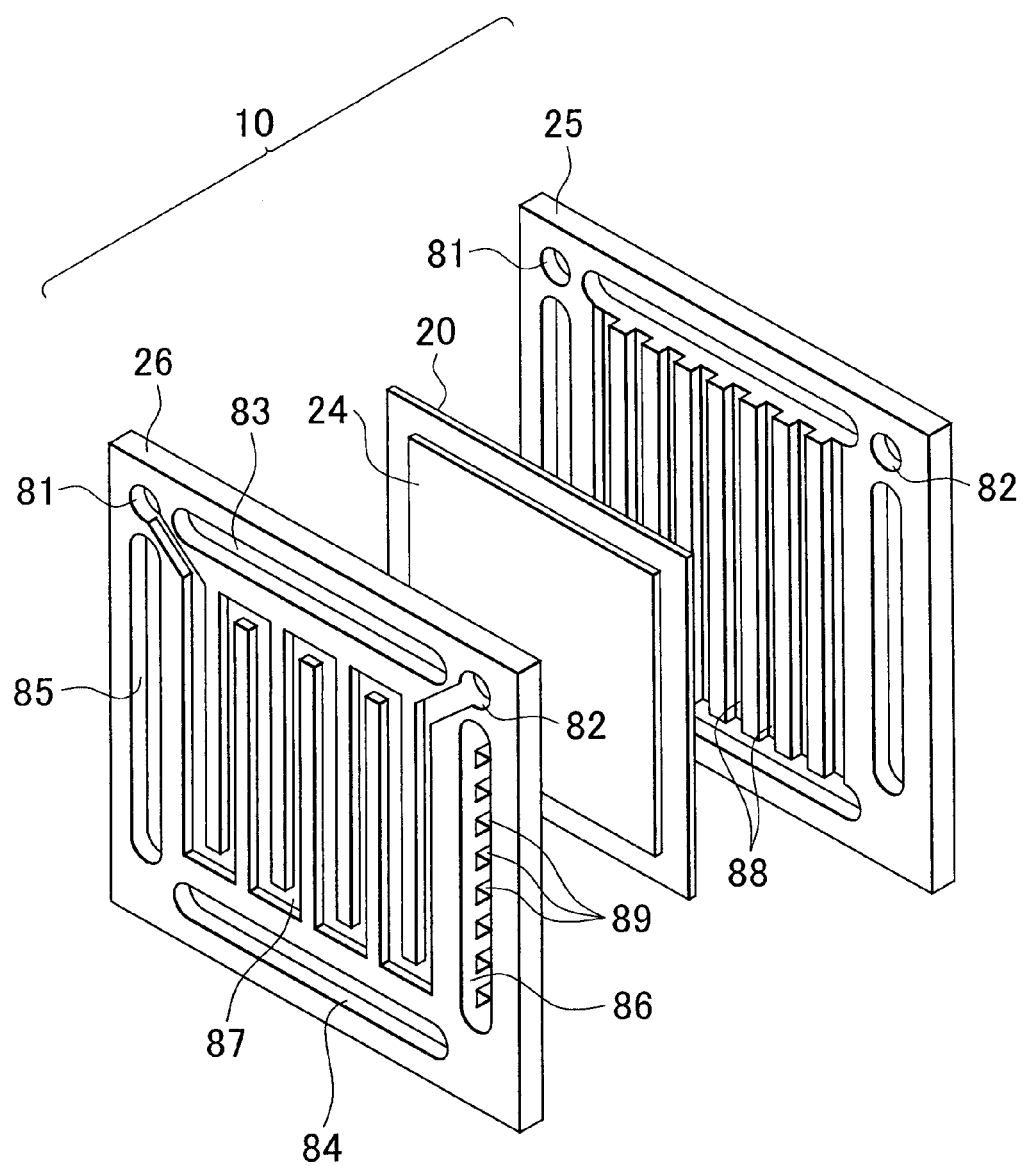

FUEL CELL APPARATUS

INCORPORATION BY REFERENCE

The disclosure of Japanese Patent Application No. 2010-175892 filed on Aug. 5, 2010 including the specification, drawings and abstract is incorporated herein by reference in its entirety.

BACKGROUND OF THE INVENTION

1. Field of the Invention
The invention relates to a fuel cell apparatus.
2. Description of Related Art
A fuel cell typically includes a fuel cell stack in which a collector plate, an insulator plate, and an end plate are arranged at both ends of a single cell stacked body in which a plurality of single cells are stacked together. With such a fuel cell stack, a manifold that supplies and discharges gas and coolant to and from a gas flow path inside the single cells and a coolant flow path formed in the fuel cell is formed through the single cell stacked body.

Also, an open portion of the manifold is formed in an end plate arranged in at least one of the two ends of the single cell stacked body. A conduit for supplying and discharging fluid from outside of the fuel cell stack is connected to the open portion of the manifold provided in the end plate. Japanese Patent Application Publication No. 2002-343406 (JP-A-2002-343406), for example, describes, as such a structure related to a connecting portion that connects the manifold to the conduit, a structure in which a manifold portion formed inside the end plate is provided inclined with respect to a manifold portion formed inside the single cell stacked body.

However, when the manifold portion inside the end plate is inclined with respect to the manifold portion inside the single cell stacked body, it may be difficult to sufficiently ensure bolt fastening strength depending on the positions of the bolt holes formed in the end plate and the like, and the manifold portion inside the end plate. Therefore, it is desirable to further improve the structure related to the bolting of the conduit to the end plate.

SUMMARY OF THE INVENTION

The invention increases the reliability of the connection between a conduit and an end plate at an end portion of a fuel cell stack.

A first aspect of the invention relates to a fuel cell apparatus that includes a fuel cell stack in which an end plate is arranged at both ends of a cell stacked body that includes a plurality of stacked single cells, and a conduit that is bolted to the end plate of the fuel cell stack, and that supplies and discharges fluid to and from the fuel cell stack. A stacked body internal manifold that is a flow path for the fluid and is provided extending through the cell stacked body is formed inside the cell stacked body. An end plate internal manifold that is communicated with the stacked body internal manifold and that extends at an angle inclined with respect to a direction in which the stacked body internal manifold extends is formed inside the end plate. A conduit internal flow path that is connected to the end plate internal manifold is formed inside the conduit. A portion of the conduit internal flow path that includes a connecting portion that connects to the end plate is such that a direction in which the portion extends is inclined in the same direction as the direction in which the end plate internal manifold is inclined, with respect to a direction perpendicular to a surface of the end plate.

According to this aspect, it is possible to inhibit interference between the end plate internal manifold and the bolts for connecting the conduit to the end plate, in the end plate. As a result, bolt length can be ensured, so fastening strength of the conduit to the end plate can be increased. Also, it is possible to suppress an increase in pressure loss due to the end plate internal manifold being inclined with respect to the stacking direction.

In the first aspect described above, the portion of the conduit internal flow path that includes the connecting portion may be such that the direction in which the portion extends is inclined at an angle that is equal to or less than an angle at which the end plate internal manifold is inclined, with respect to the direction perpendicular to the surface of the end plate. With this fuel cell apparatus, it is possible to easily realize a structure in which the direction in which the portion of the conduit internal flow path that includes the connecting portion extends is inclined.

In the first aspect described above, the portion of the conduit internal flow path that includes the connecting portion may be formed such that the direction in which the portion extends is parallel to the direction in which the end plate internal manifold extends. According to this fuel cell apparatus, it is possible to increase the effect of inhibiting interference between the bolt and the end plate internal manifold, in the end plate. Also, pressure loss when fluid flows through the conduit internal flow path and the end plate internal manifold is able to be reduced even more.

In the aspect described above, the conduit may have, at an end portion, a flange for bolting the conduit to the end plate, and the end plate may be formed with a region of the surface of the end plate where the flange is fixed, as a surface that is inclined with respect to the surface of the end plate. With this fuel cell apparatus, the direction in which the conduit internal flow path extends can be made a desired direction by providing the region where the inclined surface is formed, on the end plate surface.

In the first aspect described above, the direction in which the end plate internal manifold extends may be inclined such that an open portion on the connecting portion side of the end plate internal manifold is farther away from an outer periphery of the end plate than an open portion on the cell stacked body side of the end plate internal manifold. Accordingly, more distance can be ensured between the end plate outer periphery and the end plate internal manifold, on the surface of the end plate on the side with the connecting portion that connects with the conduit. Accordingly, more space for fastening the bolt can be ensured on the end plate surface on the side with the connecting portion that connects with the conduit. As a result, the reliability with respect to the bolt fastening strength can be improved without increasing the size of the fuel cell stack.

In the first aspect described above, the fluid may be a fluid selected from a fuel gas that includes hydrogen and is supplied to an anode, oxidizing gas that includes oxygen and is supplied to a cathode, and coolant that cools a fuel cell. With this fuel cell apparatus, sufficient connecting strength is able to be ensured, while inhibiting the size of fuel cell stack from increasing, when connecting the flow path of fluid selected from fuel gas, oxidizing gas, and coolant, to the end plate.

The invention is able to be realized by various modes other than those described above. For example, the invention is able to be realized by a mode such as a method for connecting a conduit to a fuel cell, or a fuel cell end plate, or the like.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is an exploded perspective view schematically showing the structure of a single cell that makes up part of a fuel cell according to a first example embodiment of the invention;

DETAILED DESCRIPTION OF EMBODIMENTS

Figure 2:
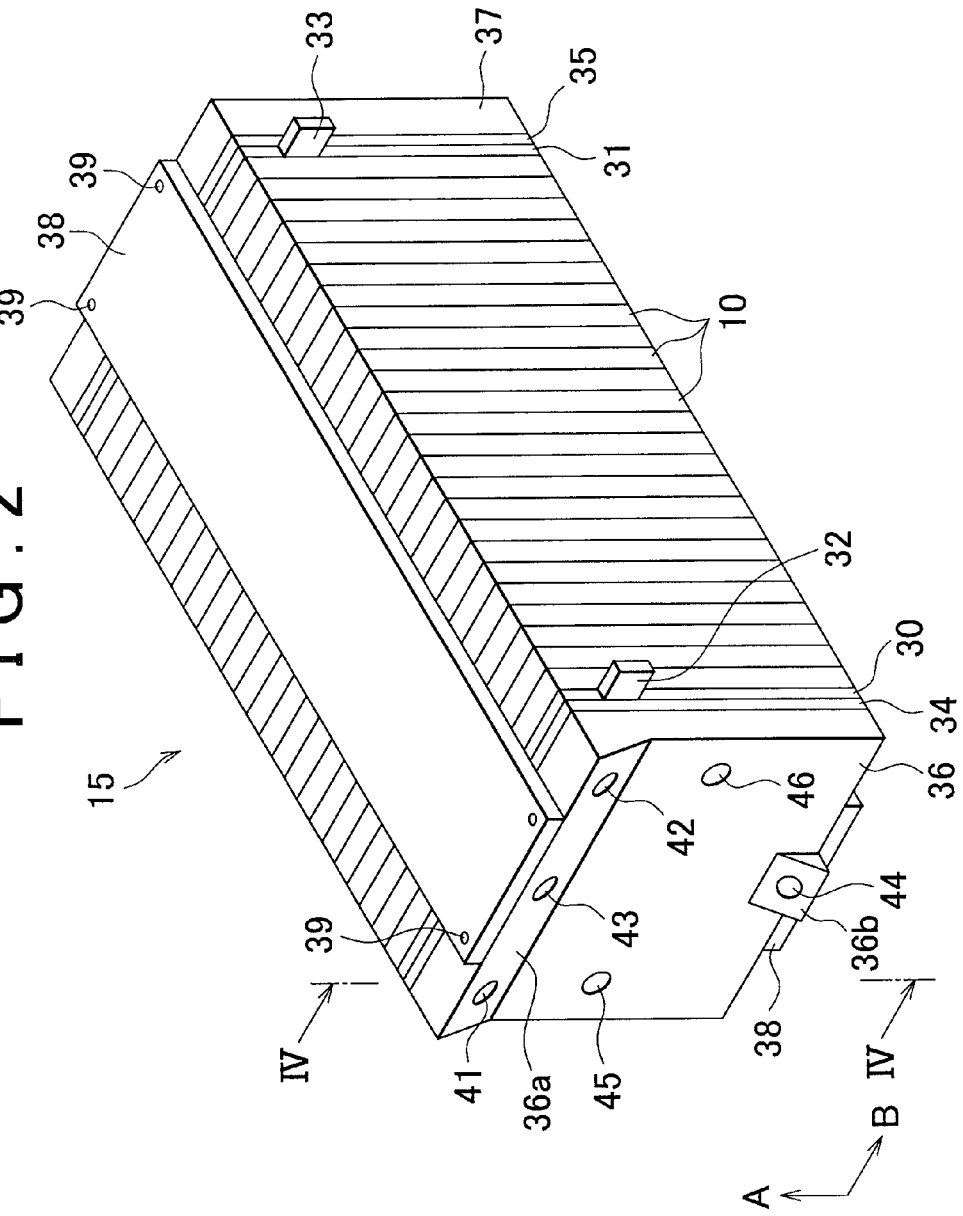
FIG. 2 is a perspective view of the outside of a fuel cell stack according to the first example embodiment.

FIG. 1 is an exploded perspective view schematically showing the structure of a single cell 10 that makes up part of a fuel cell according to a first example embodiment of the invention. Also, FIG. 2 is a perspective view of the outside of a fuel cell stack 15 formed by stacking the single cells 10 together. The fuel cell apparatus in this example embodiment includes the fuel cell stack 15 and an apparatus that supplies and discharges fluid to and from the fuel cell stack 15. First, the structure of the fuel cell stack 15 will be described.

The single cell 10 includes a Membrane Electrode Assembly (MEA) 20, gas diffusion layers 23 and 24, and gas separators 25 and 26. Incidentally, the gas diffusion layer 23 is arranged on the back of the surface on which the gas diffusion layer 24 is formed, and is therefore not shown in FIG. 1. Here, the MEA 20 is formed by an electrolyte membrane, and an anode and a cathode that are electrodes formed on opposite sides of the electrolyte membrane. This MEA 20 is sandwiched in between the gas diffusion layers 23 and 24. The sandwich structure formed by the MEA 20 and the gas diffusion layers 23 and 24 is further sandwiched between the gas separators 25 and 26 from both sides.

The electrolyte membrane that partially forms the MEA 20 is a proton conducting ion-exchange membrane that is formed by solid polymer material, for example fluorine resin, and displays good electron conductivity when wet. The cathode and the anode are layers formed on the electrolyte membrane, and include carbon particles that carry a catalyst metal (such as platinum) that promotes an electrochemical reaction, and a proton-conducting polymer electrolyte membrane. The gas diffusion layers 23 and 24 are each formed by a gas permeable, electron-conductive member. For example, the gas diffusion layers 23 and 24 may each be formed by a metal member of foam metal or metal mesh or the like, or a carbon member of carbon cloth or carbon paper or the like. These kinds of gas diffusion layers 23 and 24 serve as flow paths for the gas supplied for the electromagnetic reaction, as well as collect power.

The gas separators 25 and 26 are each formed by a gas impermeable, conductive member. For example, the gas separators 25 and 26 are formed by dense carbon that has been made gas impermeable by condensing carbon, by baked carbon, or by metal material such as stainless steel. The gas separators 25 and 26 are members that form wall surfaces of a flow path for reaction gas (fuel gas that includes hydrogen or oxidizing gas that includes oxygen) formed between the gas separators 25 and 26 and the MEA 20. Concavo-convex shapes for forming gas flow paths are formed in the surfaces of the gas separators. An oxidizing gas flow path in the cell that is a flow path for oxidizing gas is formed between the MEA 20 and the gas separator 25 that has a groove 88 formed in its surface. Also, a gas flow path in the cell that is a flow path for fuel gas is formed between the MEA 20 and the gas separator 26 that has a groove 89 formed in its surface. When assembling the single cell 10, a seal portion, not shown, is arranged on the outer periphery of the MEA 20, such that the gas separators 25 and 26 are joined while ensuring the seal of the gas flow paths inside the single cell 10.

Here, a concave portion 87 is formed on the back of the surface of the gas separator 25 in which the groove 88 that forms the oxidizing gas flow path in the cell is formed (however, the concave portion 87 is not shown in FIG. 1 because it is formed on the back side of the gas separator 25). Similarly, a concave portion 87 is formed on the back of the surface of the gas separator 26 in which the groove 89 that forms the fuel gas flow path in the cell is formed. The concave portion 87 is formed over an area that overlaps with the entire area where the gas diffusion layers 23 and 24 are arranged on the gas separators 25 and 26, and forms a coolant passage between adjacent single cells 10. That is, when a fuel cell is assembled by stacking a plurality of single cells 10 together, the concave portion 87 formed on the gas separator 25 of one adjacent single cell 10 just overlaps with the concave portion 87 formed on the gas separator 26 of another adjacent single cell 10, so as to form a coolant path. Incidentally, the coolant path between cells may also be provided each time a predetermined number of single cells 10 are stacked together, instead of being provided in between each adjacent single cell 10, for example.

The gas separators 25 and 26 each have a plurality of hole portions provided in corresponding positions near the outer periphery. When the fuel cell is assembled by stacking a plurality of the single cells 10 together, the hole portions provided in corresponding positions in the gas separators overlap with each other, thus forming flow paths through the inside of the fuel cell in the stacking direction of the gas separators. More specifically, a hole portion 83 forms an oxidizing gas supply manifold that distributes oxidizing gas to the oxidizing gas flow path in each cell, and a hole portion 84 forms an oxidizing gas discharge manifold that collects oxidizing gas from the oxidizing gas flow path in each cell. Also, a hole portion 85 forms a fuel gas supply manifold that distributes fuel gas to the fuel gas flow path in each cell, and a hole portion 86 forms a fuel gas discharge manifold that collects fuel gas from the fuel gas flow path in each cell. Further, a hole portion 81 forms a coolant supply manifold that distributes coolant to the coolant flow path between cells, and a hole portion 82 forms a coolant discharge manifold that collects coolant from the coolant flow path between cells.

As shown in FIG. 2, the fuel cell stack 15 of this example embodiment is formed by arranging collector plates 30 and 31 that include output terminals 32 and 33, insulator plates 34 and 35, and end plates 36 and 37, in that order, at both ends of a stacked body in which a plurality of the single cells 10 are stacked together. Hole portions 41 to 46 are provided in positions corresponding to the hole portions 83 to 86 provided in the gas separators, in the collector plate 30, the insulator plate 34, and the end plate 36. Gas or coolant is supplied to and discharged from the manifolds described above, via these hole portions. Incidentally, the fuel cell stack 15 is retained in a state in which the clamping pressure is applied in the stacking direction of the single cells 10. In this example embodiment, a tension plate 38 that is connected to the end plates 36 and 37 by bolts 39 is used as a retaining member.

Incidentally, as shown in FIG. 2, the end plate 36 in which the manifold is open is formed as an flat plate-shaped member overall, but inclined regions that form inclined surfaces are formed in some parts. That is, the regions that include the hole portions 41, 42, 43, and 44 are the inclined regions. The inclined regions formed on the surface of the end plate 36 will be described in detail later.

Also, as shown in FIG. 2, in this example embodiment, all of the manifolds are open on one end portion side of the fuel cell stack 15 (i.e., on the end plate 36 side), but the structure may be different. With the fluid of at least one of the fuel gas, the oxidizing gas, or the coolant, the supply manifold and the discharge manifold may open at different end plates. Also, a member that absorbs variation in the clamping pressure, such as a plate spring, may further be provided on one end portion side (such as the side with the end plate 37 without a manifold open portion, in FIG. 2) in the fuel cell stack 15.

Figure 3:
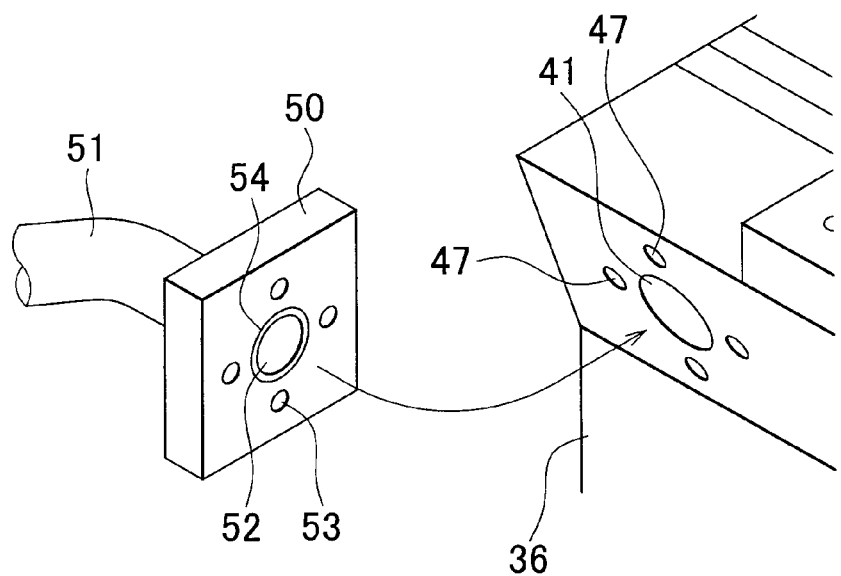
FIG. 3 is an enlarged view of a tip end portion of a coolant supply conduit and the area near a hole portion according to the first example embodiment.

As described above, with the fuel cell stack 15, gas or coolant is supplied and discharged via the hole portions 41 to 46 formed in the end plate 36. The apparatuses that supply and discharge the fuel gas, the oxidizing gas, and the coolant include conduits for supplying and discharging these fluids, and a flange that is a structure for connecting the conduit to the end plate 36 is provided on a tip end portion of each conduit. FIG. 3 is an enlarged view of a region near the hole portion 41 in the fuel cell stack 15 shown in FIG. 2, and is also an enlarged view of a tip end portion of a coolant supply conduit 51 of a coolant supply apparatus that is connected to the hole portion 41.

As shown in FIG. 3, a plurality of bolt holes 47 (four in this example embodiment) are formed around the hole portion 41. Also, the coolant flow path formed in the coolant supply conduit 51 of the coolant supply apparatus opens at an open portion 52 provided in a flange 50 provided on the tip end portion of the coolant supply conduit 51. The open portion 52 is shaped so as to just overlap with the hole portion 41 formed in the end plate 36. A plurality of bolt holes 53 are formed in the flange 50, in positions corresponding to the bolt holes 47 provided in the end plate 36, around the open portion 52. Also, an O-ring groove 54 is formed surrounding the open portion 52 in a position closer to the open portion 52 than the bolt holes 53. When connecting the fuel cell stack 15 with the coolant supply apparatus, the flange 50 is placed against the end plate 36 so that the hole portion 41 and the open portion 52 overlap, and the bolt holes overlap, and the flange 50 is then fixed to the end plate 36 by fitting bolts through the bolt holes.

Incidentally, FIG. 3 shows the structure near the hole portion 41, but bolt holes are also formed in the same way around the other hole portions 42 to 46 as well. Further, flanges of the same structure as the flange 50 are also provided on the tip end portions of the conduits of fluid supply and discharge apparatuses that are connected to the other hole portion 42 to 46, and these flanges are also fastened using bolts.

Figure 4:
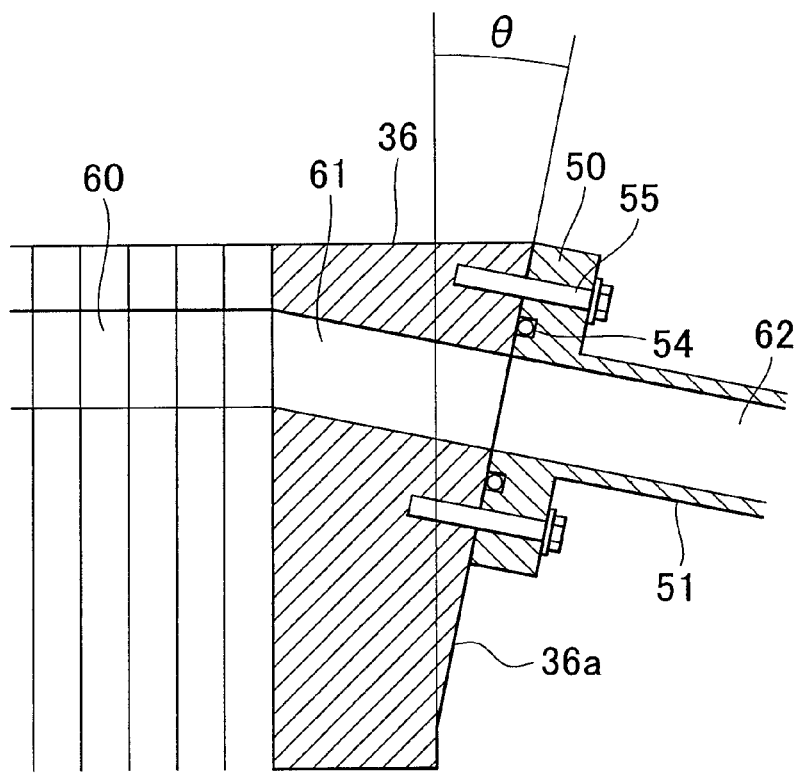
FIG. 4 is a sectional view showing a frame format of the coolant supply conduit connected to an end plate according to the first example embodiment.

FIG. 4 is a sectional view taken along line 4-4 in FIG. 2, showing a frame format of the coolant supply conduit 51 connected to the end plate 36 via the flange 50. A coolant supply manifold, formed by the hole portion 81 provided in the gas separators 25 and 26 and the hole portion 41 provided in the collector plate 30, the insulator plate 34, and the end plate 36, is provided inside the fuel cell stack 15. In the description below, the portion formed by the hole portion 81 provided in the gas separators 25 and 26 and the hole portion 41 provided in the collector plate 30 and the insulator plate 34 inside the coolant supply manifold will be referred to as a stacked body internal manifold 60. Also, the portion formed by the hole portion 41 provided in the end plate 36 inside the coolant supply manifold will be referred to as an end plate internal manifold 61. Incidentally, the coolant flow path formed inside the coolant supply conduit 51 will be referred to as a conduit internal flow path 62.

As shown in FIG. 4, the flange 50 is fixed to the end plate 36 by bolts 55 fitted into the bolt holes 47 in the end plate 36 and the bolt holes 53 in the flange 50. At this time, the bolts 55 are fitted into the bolts holes vertically with respect to the surface of the end plate 36 where the flange 50 is arranged. Also, the O-ring for ensuring a seal is arranged, at a connecting portion of the end plate and the flange, i.e., at a connecting portion of the coolant supply manifold inside the fuel cell stack 15 and the flow path inside the coolant supply conduit 51, in the O-ring groove 54 provided in the flange 50.

Here, the hole portion 81 that forms the stacked body internal manifold 60 is formed in the same shape and in the same position in both of the gas separators 25 and 26. Also, the hole portion 41 that forms the stacked body internal manifold 60 is also formed in the same shape and in the same position as the hole portion 81, in the collector plate 30 and the insulator plate 34. Therefore, the direction in which the stacked body internal manifold 60 extends is parallel to the stacking direction of the single cells 10.

In contrast, the end plate internal manifold 61 is such that the direction in which it extends (i.e., the direction in which the flow path wall of the end plate internal manifold 61; the direction in which coolant flows) is inclined at an angle with respect to the direction in which the flow path wall of the stacked body internal manifold 60 extends. More specifically, the end plate internal manifold 61 is inclined with respect to the stacking direction of the single cells 10, in a direction such that the open portion on the side contacting the flange 50 is farther away from the outer periphery of the end plate 36 than the open portion on the side contacting the insulator plate 34. Incidentally, the hole portion 41 of the end plate 36 is formed such that the flow path cross-section of the end plate internal manifold 61 has an overall uniform shape.

Also, the conduit internal flow path 62 is such that the direction in which it extends (i.e., the direction in which the flow path wall of the conduit internal flow path 62 extends; the direction in which coolant flows) at the portion that includes the connecting portion that connects to the end plate 36 is parallel to the direction in which the end plate internal manifold 61 extends. That is, coolant flows in a straight line when flowing from the end plate internal manifold 61 to the conduit internal flow path 62.

Figure 5:
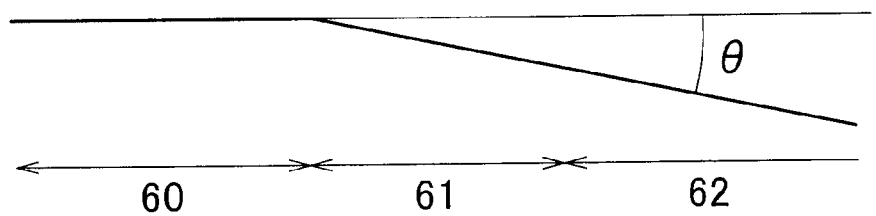
FIG. 5 is a view showing the angle created by the directions in which the flow paths extend according the first example embodiment.

FIG. 5 is a view showing the angle created by the directions in which the stacked body internal manifold 60, the end plate internal manifold 61, and the conduit internal flow path 62 extend. In FIG. 5, the angle created by the direction in which the end plate internal manifold 61 and the conduit internal flow path 62 extend with respect to the stacked body internal manifold 60 is denoted as angle θ. Incidentally, in this example embodiment, if the lines connecting the centers of the flow path cross-sections serve as flow path axes of the flow paths, then the directions in which the flow paths extend may be referred to as the directions of the flow path axes of the flow paths.

As described above, at the surface of the end plate 36, the region that includes the hole portion 41 is an inclined region 36a. As shown in FIG. 4, the angle that this inclined region 36a creates with respect to the surface of the end plate 36 (i.e., the other flat region that forms a flat surface of the end plate 36) is the same angle θ as the angle created between the direction in which the end plate internal manifold 61 and the conduit internal flow path 62 extend and the stacking direction. Here, the surface of the flange 50 that contacts the end plate 36 is formed perpendicular to the conduit internal flow path 62 near the portion that connects to the end plate 36. Therefore, the directions in which the end plate internal manifold 61 and the conduit internal flow path 62 extend can be made to overlap in a straight line by fixing the flange 50 to the inclined region 36a that is inclined at the angle described above.

Incidentally, in FIGS. 3 to 5, the connecting structure of the flow path related to the hole portion 41 is illustrated, but the connecting structure of the flow paths is also the same for the other hole portions 42 to 44. The inclined region 36a is formed to include the three hole portions 41 to 43 in the surface of the end plate 36 in this example embodiment. Also, an inclined region 36b is formed to include the hole portion 44. With this kind of end plate 36, the end plate internal manifolds corresponding to the hole portions 42, 43, and 44 are also provided such that the direction in which they extend is inclined with respect to the stacking direction, away from the outer periphery of the end plate 36 nearer to the surface on the side with the portions that connect to the fluid supply and discharge apparatuses. Also, the directions in which the end plate internal manifolds and the conduit internal flow paths extend may be made to overlap in a straight line by connecting the conduits with the hole portions 42 to 44 via flanges similar to the flange 50 at the inclined regions 36a and 36b.

In the end plate 36, the hole portions 45 and 46 are able to be provided in the flat region described above. The end plate internal manifolds corresponding to the hole portions 45 and 46 provided in this kind of flat region are not inclined with respect to the stacking direction, but are instead provided overlapping in a straight line with the stacked body internal manifolds.

Incidentally, in FIG. 3, the flange 50 only connects the coolant supply conduit to the coolant supply manifold, but the structure may be different. For example, a flange corresponding to a plurality of connecting locations may be formed by a single part, as a flange that connects fluid supply and discharge apparatuses to the manifolds inside the fuel cell stack 15. More specifically, in addition to the conduit of the coolant supply apparatus, a conduit for an oxidizing gas supply apparatus and a conduit for a coolant discharge apparatus may be opened, bolt holes and O-ring grooves corresponding to the hole portions 42 and 43, in addition to the hole portion 41, may be formed, and a flange that can connect the conduits corresponding to the hole portions 41 to 43 all at once, may be used.

Alternatively, instead of providing the inclined region 36a as a region that includes all of the hole portions 41 to 43, inclined regions corresponding to each of the hole portions 41, 42, and 43, similar to the inclined region 36b provided corresponding to the hole portion 44, may be provided separated from each other. In this case, a flange in which a corresponding single conduit opens may be connected to each hole portion.

According to the fuel cell apparatus of the example embodiment formed as described above, more distance from the end plate outer periphery can be ensured at the flange side open portion of the end plate internal manifold 61, by inclining the end plate internal manifold 61 toward the inside in the direction away from the outer periphery of the end plate 36, with respect to the stacked body internal manifold 60. Therefore, the fuel cell stack 15 can be inhibited from becoming larger without changing the arrangement of the stacked body internal manifold 60. Furthermore, according to this example embodiment, the inclined region is provided on the end plate 36 so that the directions in which the end plate internal manifold and the conduit internal flow path extend overlap in a straight line, thus enabling the fastening strength by the bolts 55 to be increased. Hereinafter, the effects of the example embodiment will be described in greater detail.

In a fuel cell, it is generally preferable to ensure a larger region in which electric power is generated, i.e., a larger region in which the gas flow path in the cell is formed in the MEA 20, in order to increase the power generating performance of the fuel cell. Therefore, manifolds provided in a fuel cell stack for supplying and discharging fluid are preferably arranged in positions as close to the stack side surface as possible. That is, the hole portions 81 to 86 are preferably formed as close to the outer periphery of the gas separators 25 and 26 as possible, taking into account the strength and the like of the gas separators 25 and 26 near the locations where the hole portions 81 to 86 for forming the manifolds are provided.

Meanwhile, when connecting the fluid supply and discharge conduits to the manifolds via flanges, the connecting strength can be increased more as the depth of the bolt holes 47 provided in the end plate 36 increases, and as the diameter of the bolt holes 47 increases and a thicker bolt is used. Moreover, in order to ensure sealability at the mounting portion of the flange, a sufficiently large O-ring must be used. Therefore, in order to ensure space to arrange a sufficiently large bolt and O-ring to increase the reliability of the connection between the end plate 36 and the flange 50, it is desirable to ensure more distance between the hole portions 41 to 46 and the outer periphery of the flange and the end plate.

One possible way to achieve this is to make the end plate 36 slightly larger than the gas separators 25 and 26, for example. With this kind of structure, the distance between the hole portions 41 to 46 and the outer periphery of the end plate 36 can be increased at the end plate 36, thus making it easy to ensure connecting strength by the bolts. However, such as structure would lead to an increase in the size of the overall fuel cell stack, so it may be difficult to employ.

Figure 6:
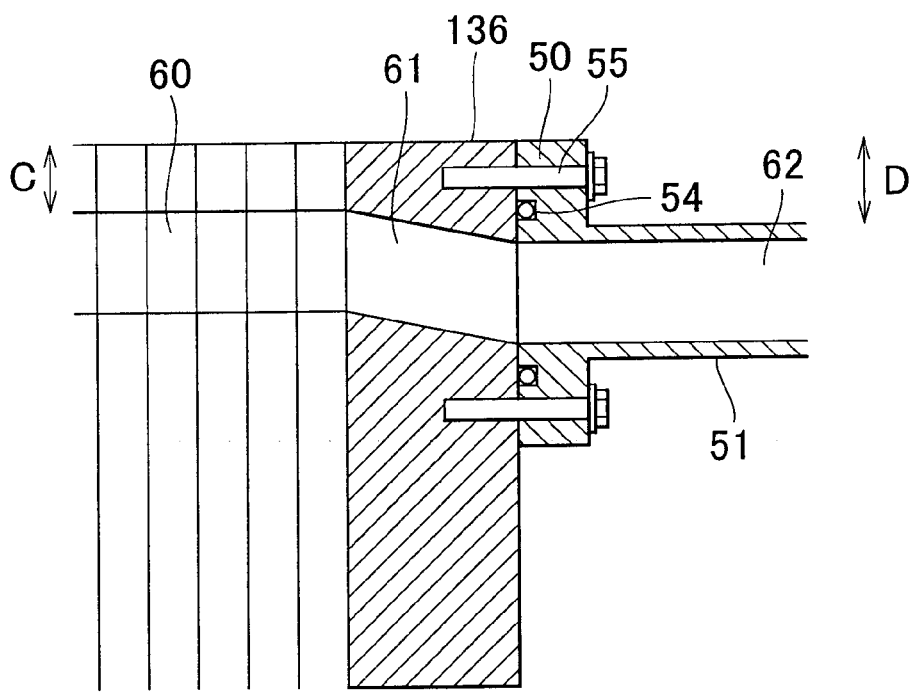
FIG. 6 is a sectional view showing a frame format of a structure that uses an end plate not provided with an inclined region according to related art.

FIG. 6 is a sectional view showing a frame format of a structure according to related art that uses an end plate 136 in which the end plate internal manifold 61 is inclined, but which is does not have an inclined region on the surface. In FIG. 6, the distance between the stacked body internal manifold 60 formed inside the stacked body of single cells 10 and the side surface of the stacked body is denoted as distance C. As shown in FIG. 6, the distance between flange side open portion of the end plate internal manifold 61 and the outer periphery of the end plate 136 is distance D that is greater than the distance C, due to providing the end plate internal manifold 61 inclined so that the open portion on the flange side is away from the outer periphery of the end plate. Increasing the distance between the flange side open portion of the end plate internal manifold 61 and the outer periphery of the end plate 136 in this way makes it possible to ensure more space within which to arrange the bolts 55 and the O-ring without increasing the size of the end plate 136 and the flange 50.

However, by inclining the end plate internal manifold 61 with respect to the stacking direction in this way, the distance between the bolt 55 that is provided near the outer periphery of the end plate 136 and the end plate internal manifold 61 becomes smaller closer to the tip end of the bolt 55. The reason that the distance between the bolt 55 and the end plate internal manifold 61 becomes smaller closer to the tip end of the bolt 55 is because the bolt is typically driven in perpendicular to the mounting surface. Therefore, in order to avoid interference between the bolt 55 and the end plate internal manifold 61, the bolt hole may need to be made shorter. However, if the bolt hole is made shorter, the connection strength may be insufficient due to insufficient engagement allowance, so this structure may be difficult to employ.

In this example embodiment, as shown in FIG. 4, the end plate internal manifold 61 is inclined with respect to the stacking direction, and the inclined regions 36a and 36b are provided on the surface of the end plate 36. Therefore, at the flange side open portion of the end plate internal manifold 61, in addition to the effect of increasing the distance from the outer periphery of the end plate 36, the axes of the end plate internal manifold 61 and the bolt holes 47 are able to be close to parallel. As a result, it is possible to inhibit the tip end portion of the bolt 55 from coming close to the end plate internal manifold 61, and therefore possible to ensure sufficient bolt length (allowance), which enables the connection strength to be increased.

Furthermore, according to the fuel cell apparatus of this example embodiment, the direction in which the end plate internal manifold 61 extends overlaps in a straight line with the direction in which the conduit internal flow path 62 extends, so the flow path is not bent at the connecting portion of the end plate internal manifold 61 and the conduit internal flow path 62. Therefore, it is possible to suppress an increase in the number of bends of the flow path, even if the end plate internal manifold 61 is inclined with respect to the stacking direction. As a result, an increase in pressure loss due to a bend in the flow path can be suppressed.

Incidentally, in the first example embodiment, both the inclined region 36a and the inclined region 36b are provided on the end plate 36, but it is also possible to provided only one of these. Even with only one, the effect of suppressing an increase in the size of the fuel cell stack can still be obtained.

In FIG. 2, the vertical direction is denoted as direction A and the horizontal direction is denoted as direction B. The side of the end plate 36 near the hole portions 41 and 45 or the hole portions 42 and 46 is a side in the vertical direction, and the side of the end plate 36 near the hole portions 41 to 43 or the hole portion 44 is a side in the horizontal direction. In the first example embodiment described above, the end plate internal manifold 61 corresponding to the hole portions 41 to 43 in the end plate 36 is inclined vertically downward with respect to the stacked body internal manifold 60. Also, the end plate internal manifold 61 corresponding to the hole portion 44 in the end plate 36 is inclined vertically upward with respect to the stacked body internal manifold 60. As a result, the size of the fuel cell stack 15 in the vertical direction is inhibited from increasing.

Figure 7:
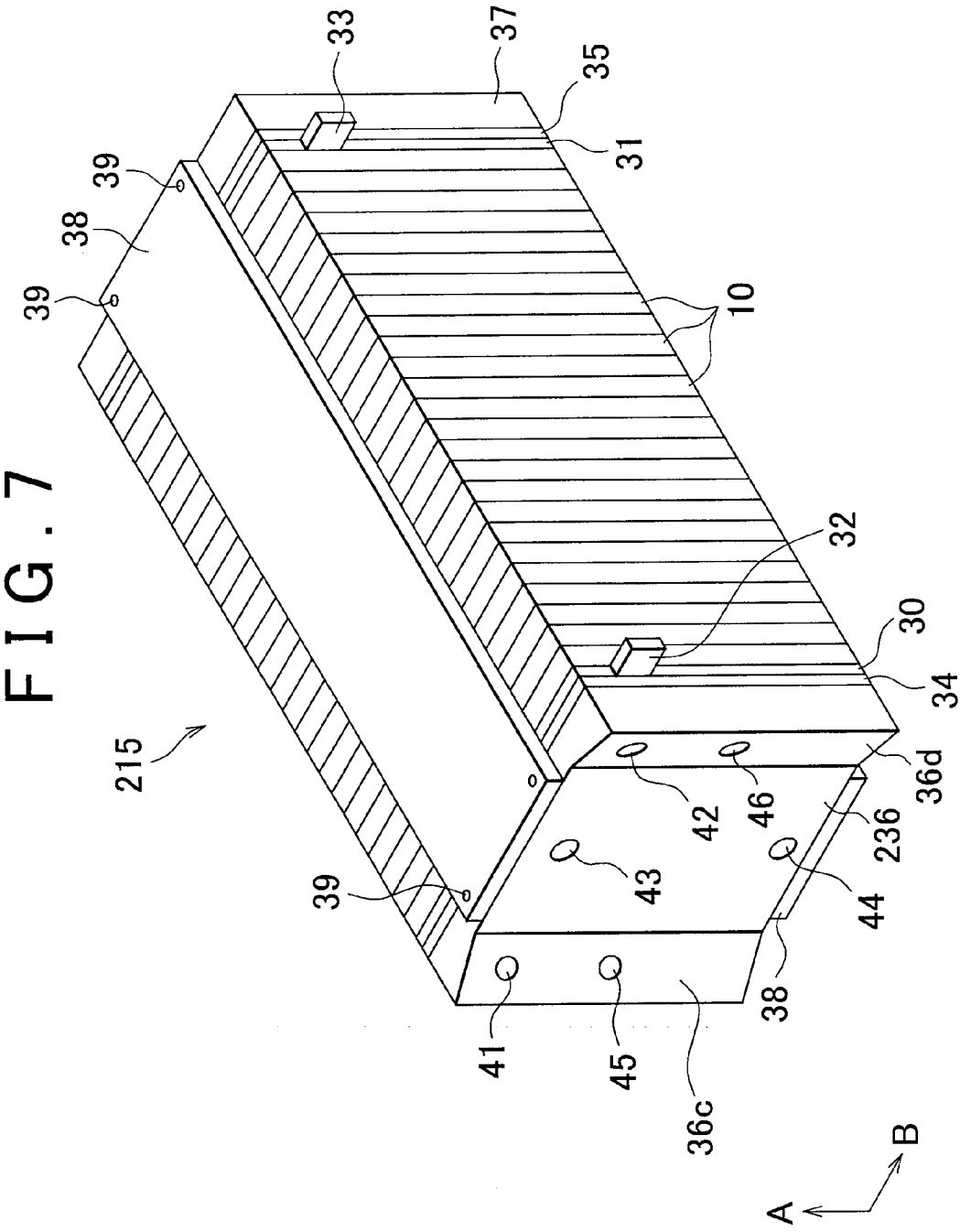
FIG. 7 is a perspective view of the outside of a fuel cell stack according to a second example embodiment of the invention.

Meanwhile, the size of the fuel cell stack in the horizontal direction is also able to be inhibited from increasing. FIG. 7 is a perspective view of the outside of a fuel cell stack 215 according to a second example embodiment of the invention. The fuel cell stack 215 has the same structure as the fuel cell stack 15, except for that it is provided with an end plate 236 instead of the end plate 36. Therefore, like constituent elements will be denoted by like reference numerals and detailed descriptions of those elements will be omitted.

The end plate 236 includes inclined regions 36c and 36d instead of the inclined regions 36a and 36b. That is, the region including the hole portions 41 and 45 is the inclined region 36c and the region including the hole portions 42 and 46 is the inclined region 36d. Also, the end plate internal manifolds formed in the end plate 236 that correspond to the hole portions 41 and 45 are provided inclined in a direction such that the flange side open portions are away from the outer periphery of the end plate 236 (i.e., inclined toward the right in the horizontal direction in FIG. 7 with respect to the stacked body internal manifolds), while the end plate internal manifolds formed in the end plate 236 that correspond to the hole portions 42 and 46 are provided inclined such that the flange side open portions are away from the outer periphery of the end plate 236 (i.e., inclined toward the left in the horizontal direction in FIG. 7 with respect to the stacked body internal manifolds). The directions in which the end plate internal manifolds and the conduit internal flow paths extend can be made to be in a straight line by connecting the corresponding fluid supply and discharge conduits to the hole portions 41, 42, 45, and 46, via the flange 50, at the inclined regions 36c and 36d. With this kind of structure, the second example embodiment is able to inhibit the size of the fuel cell stack 215 from increasing in the horizontal direction.

Figure 8:
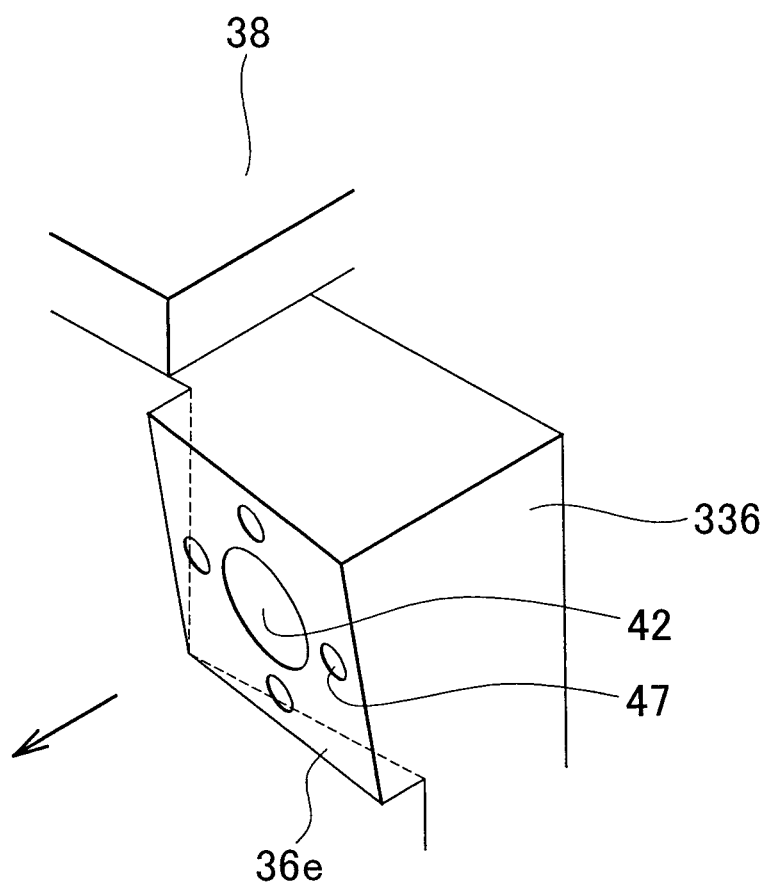
FIG. 8 is a view of the structure of an end plate according to a third example embodiment of the invention.

Alternatively, the size of the fuel cell stack can also be inhibited from increasing in both the vertical direction and the horizontal direction. This kind of structure will now be described as a third example embodiment. FIG. 8 is a view of the structure of an end plate 336 used instead of the end plate 36 in a fuel cell stack according to the third example embodiment. In this third example embodiment, constituent elements common to the first example embodiment will be denoted by like reference numerals and detailed descriptions of those elements will be omitted.

FIG. 8 is an enlarged view of only the structure near the hole portion 42. In the third example embodiment, the region where the hole portion 42 is provided is an inclined region 36e. In the end plate 336, an end plate internal manifold is formed such that the flange side open portion of the end plate internal manifold is farther away from both sides that form an end plate corner near the hole portion 42 than the stacked body side open portion. That is, the direction in which the end plate internal manifold extends is inclined toward a center portion of the end plate 336 with respect to the stacked body internal manifold. The inclination angle of the inclined region 36e is an angle at which the directions in which the end plate internal manifold and the conduit internal flow path extend are able to overlap in a straight line when the conduit of the coolant discharge apparatus is connected via the flange 50.

Incidentally, with this kind of end plate 336 of the third example embodiment, in the region that includes the hole portion 41 provided on another corner of the end plate as well, it is sufficient that an inclined surface similar to the inclined region 36e be provided, and the end plate internal manifold be formed such that the direction in which the end plate internal manifold extends is inclined toward the center portion of the end plate. Also, for the hole portion provided in the middle of the side that forms the outer periphery of the end plate, just like the hole portion 44, an inclined region similar to the inclined region 36b shown in FIG. 2 need only be provided. Also, the end plate internal manifolds need only be inclined with respect to the stacked body internal manifolds, in the direction in which the flange side open portion is away from the outer periphery of the end plate. This kind of structure makes it possible to inhibit the size of the fuel cell stack from increasing in both the vertical direction and the horizontal direction.

While the invention has been described with reference to example embodiments thereof, it should be understood that the invention is not limited to the example embodiments. That is, the invention may be carried out in modes that have been modified or improved in any of a variety of ways without departing from the scope thereof. For example, the modified examples described below are also possible.

Figure 9A:
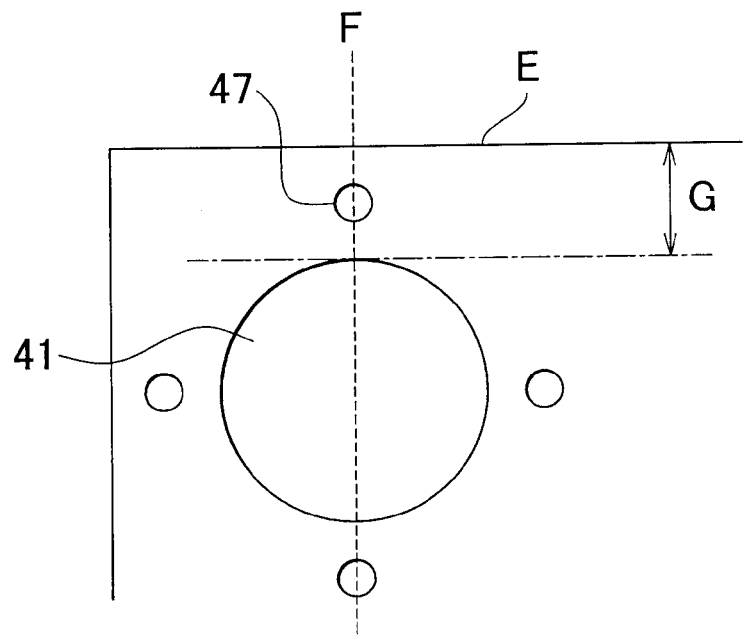
FIG. 9A is a view illustrating the arrangement of bolt holes according to the first to the third example embodiments.
Figure 9B:
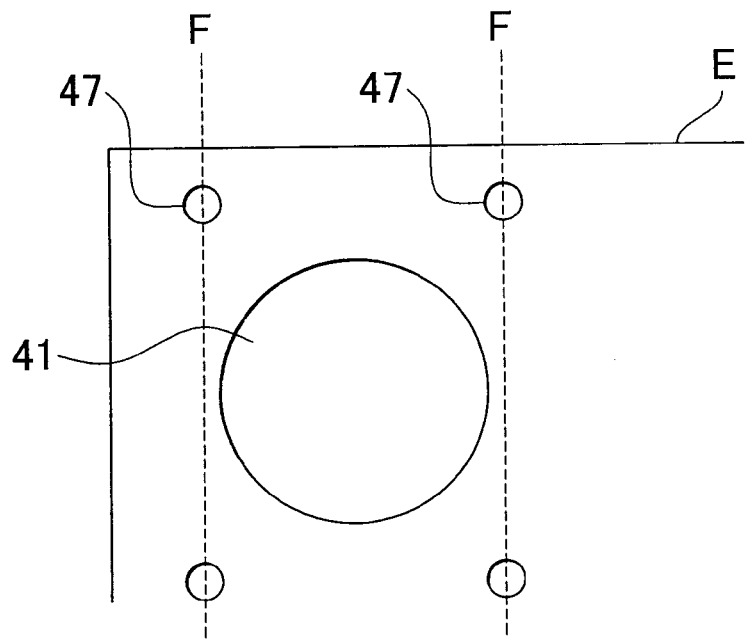
FIG. 9B is a view illustrating an arrangement of bolt holes according to a modified example of these example embodiments.

Similar effects are also able to be obtained when the arrangement of the bolt holes 47 provided in the end plate is different than that in the first to the third example embodiments described above. FIG. 9A is a view of the arrangement of the bolt holes 47 as it is in the first to the third example embodiments. Also, FIG. 9B is a view of an arrangement of the bolt holes 47 according to a modified example of these example embodiments, that is different from the arrangement in the first to the third example embodiments. As described above, providing an inclined region and inclining the end plate internal manifold makes it possible to ensure distance (indicated by the distance G in FIG. 9) between the hole portion (i.e., the hole portion 41 in FIG. 9) and the end plate outer periphery (indicated by side E in FIG. 9), and thus possible to ensure space to provide the bolt holes 47. In the first to the third example embodiments, the line (i.e., line F in FIG. 9) in the vertical direction that passes through the center of the bolt hole near side E passes through the center of the hole portion 41, so the effect obtained from ensuring the distance G is significant. However, the line in the vertical direction that passes through the center of the bolt hole near side E (indicated by line F in FIG. 9) does not have to pass through the center of the hole portion 41, as shown in FIG. 9B. The same effect is able to be obtained as long as the bolt holes 47 are within the range of the distance G from side E.

Also, in the first to the third example embodiments, all of the connections with the fluid supply and discharge apparatuses are provided at the end plate where one end portion of the fuel cell stack is arranged, but the structure may be different. For example, at least a portion of the manifolds in the fuel cell stack may be open at the other end plate side. In this case, the end plate internal manifolds and the inclined regions may be formed on both end plates to ensure the distance from the end plate outer periphery.

In the first to the third example embodiments, the end plate internal manifold 61 and the conduit internal flow path 62 overlap in a straight line, but the structure may be different. An inclined surface may simply be provided on the end plate such that the angle formed by the direction in which the conduit internal flow path 62 near the connecting portion extends and the direction in which the stacked body internal manifold 60 extends approaches the angle formed by the direction in which the end plate internal manifold 61 extends and the direction in which the stacked body internal manifold 60 extends. For example, the direction in which the conduit internal flow path 62 near the connecting portion extends may be inclined in the same direction as the direction in which the end plate internal manifold extends is inclined, with respect to the stacking direction, and the angle formed between the direction in which the conduit internal flow path 62 near the connecting portion extends and the stacking direction may be equal to or less than the angle formed between the direction in which the end plate internal manifold extends and the stacking direction. According to this kind of structure, the same effect of increasing the fastening strength of the bolts is able to be obtained by avoiding interference between the bolts 55 and the end plate internal manifold 61.

Also, in the first to the third example embodiments, the flow paths in the conduits of the fluid supply and discharge apparatuses, and the hole portions 41 to 46 provided in the collector plate 30, the insulator plate 34, and the end plate 36 have the same sectional size and have shapes that overlap with one another, but the structure may be different. That is, the same effect can be obtained as long as the flow paths are formed such that the directions in which they extend are inclined, as they are in the example embodiments. However, it is preferable that the sectional areas of the flow paths be equal in order to suppress an increase in pressure loss inside the flow paths.

Furthermore, in the first to the third example embodiments, the end plate internal manifolds are inclined toward the center portion of the cell surface in order to ensure bolt fastening strength, but the structure may be different. That is, same effect from inhibiting interference between the end plate internal manifolds and the bolt holes can be obtained by applying the invention at a connecting portion where a conduit is connected and providing an inclined region on the end plate, when it is necessary to incline the end plate internal manifolds in some direction. Also, the same effect of suppressing fluid pressure loss due to bends in the flow paths can also be obtained.

What is claimed is:

1. A fuel cell apparatus comprising:
   a fuel cell stack in which an end plate is arranged at both ends of a cell stacked body that includes a plurality of stacked single cells;
   a conduit that is bolted to the end plate of the fuel cell stack, and that supplies and discharges fluid to and from the fuel cell stack; and
   a flange connecting the conduit to the end plate,
   wherein a stacked body internal manifold that is a flow path for the fluid and is provided extending through the cell stacked body is formed inside the cell stacked body;
   an end plate internal manifold that is communicated with the stacked body internal manifold and that extends in a direction that is at an angle inclined with respect to a direction in which the stacked body internal manifold extends is formed inside the end plate;
   a conduit internal flow path that is connected to the end plate internal manifold is formed inside the conduit;
   a portion of the conduit internal flow path that includes a connecting portion that connects to the end plate is such that a direction in which the portion extends is inclined in the same direction as the direction in which the end plate internal manifold is inclined, with respect to a direction perpendicular to a surface of the end plate;
   a surface of the flange that contacts the end plate is formed perpendicular to the conduit internal flow path near the portion that connects to the end plate;
   the end plate includes one or more bolt holes into which a respective bolt for connecting the flange to the end date is fitted; and
   each of the one or more bolt holes extends along an axis that is parallel to the direction in which the end plate internal manifold extends.

2. The fuel cell apparatus according to claim 1, wherein the portion of the conduit internal flow path that includes the connecting portion is such that the direction in which the portion extends is inclined at an angle that is equal to or less than an angle at which the end plate internal manifold is inclined, with respect to the direction perpendicular to the surface of the end plate.

3. The fuel cell apparatus according to claim 1, wherein the portion of the conduit internal flow path that includes the connecting portion is formed such that the direction in which the portion extends is parallel to the direction in which the end plate internal manifold extends.

4. The fuel cell apparatus according to claim 1, wherein the end plate is formed with a region of the surface of the end plate where the flange is fixed, as a surface that is inclined with respect to the surface of the end plate.

5. The fuel cell apparatus according to claim 1, wherein the direction in which the end plate internal manifold extends is inclined such that an open portion on the connecting portion side of the end plate internal manifold is farther away from an outer periphery of the end plate than an open portion on the cell stacked body side of the end plate internal manifold.

6. The fuel cell apparatus according to claim 1, wherein the fluid is a fluid selected from a fuel gas that includes hydrogen and is supplied to an anode, oxidizing gas that includes oxygen and is supplied to a cathode, and coolant that cools a fuel cell.

* * * * *